Figures 1, 2:
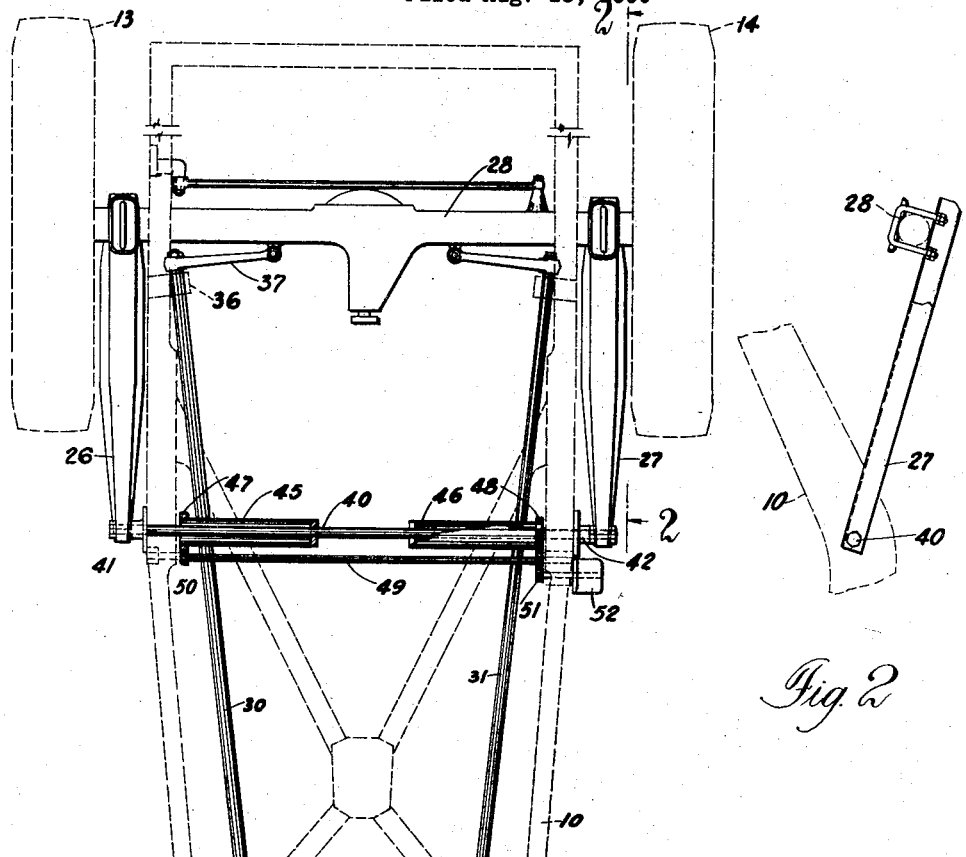

Nov. 11, 1958     F. R. McFARLAND     2,859,976
ANTI-ROLL AND LEVELER UNIT FOR VEHICLE SUSPENSIONS
Filed Aug. 13, 1956

INVENTOR
Forest R. McFarland
BY
Redrow & Easton

United States Patent Office 2,859,976
Patented Nov. 11, 1958

2,859,976

ANTI-ROLL AND LEVELER UNIT FOR VEHICLE SUSPENSIONS

Forest R. McFarland, Huntington Woods, Mich., assignor to Studebaker-Packard Corporation, Detroit, Mich., a corporation of Michigan Application August 13, 1956, Serial No. 603,492

6 Claims. (Cl. 280—104)

This invention relates to suspensions for motor vehicles and particularly to an anti-roll and leveler unit for vehicle suspensions.

Spring suspensions for motor vehicles have been previously devised which operate in conjunction with levelizing apparatus to maintain the frame of the vehicle at a predetermined spaced elevation relative to the axles of the vehicle under all load conditions. In the present invention a new and improved anti-roll bar assembly is provided which may be installed at the front or the rear of a vehicle and which is a part of the vehicle suspension system. In addition to the normal anti-roll function the anti-roll and leveler assembly also functions to effect levelizing of the vehicle when actuated by levelizing apparatus which includes a level sensing device.

A main object of the invention is to provide a new and improved vehicle suspension system which includes an anti-roll bar assembly which functions to minimize rolling of the vehicle and also functions to effect levelizing of the vehicle.

Other objects of the invention will become apparent from the following specification, the drawing relating thereto, and the appended claims.

In the drawing:

Fig. 1 is a plan view of a vehicle frame and suspension system which embodies the present invention which includes the new and improved anti-roll assembly; and Fig. 2 is a sectional view taken on line II—II of Fig. 1.

In Fig. 1 of the drawing there is shown a chassis having front wheels 11 and 12 and rear wheels 13 and 14. The wheels may be connected to frame 10 in different ways within the scope of the invention and it is only by way of illustration that they are mounted in the manner shown.

Front wheels 11 and 12 are each connected to frame 10 for swingable or pivotal movement about generally longitudinal pivotal supports 15 and 16 by conventional lower and upper lever arms which are joined together at their outer ends by a king pin mounting member. Levers 17 and 18 are provided for wheel 11 and levers 20 and 21 and are provided for wheel 12.

Rear wheels 13 and 14 are mounted to frame 10 for pivotal movement about a transverse axis by lever arms 26 and 27. An axle housing 28 is disposed between rear wheels 13 and 14 although the invention is not limited to being utilized with axle constructions of this type.

Various arrangements for resiliently mounting frame 10 relative to the wheels may be provided within the scope of the invention because the anti-roll bar assembly to be described further on has general utility in any type of vehicle suspension system. The invention is of particular advantage, however, in a suspension system in which the front and rear wheels have common or interdependent spring means. In that type of suspension one resilient unit may service both the front wheel and the rear wheel on one side of the vehicle, for example, such that when a front or rear wheel passes over a change in elevation, producing a raising or lowering effort at one end of the vehicle, a simultaneous and similar raising or lowering effort is applied at the opposite end of the vehicle. The action of the common or interdependent spring means results in the simultaneous application of substantially equivalent vertical forces at opposite ends of the frame or body whenever the wheel or wheels at one end of the vehicle pass over a change in elevation and, as a consequence, the vehicle rides substantially free of pitching. The providing of spring means common to the front and rear wheels results in what may be termed a balanced suspension which has the additional advantage of reducing greatly the spring rate at each wheel and affording increased riding comfort by producing the effect of very soft springs.

There are various types of suspensions in which common spring means are provided for the front and rear wheels and one type illustrated herein is a torsion bar suspension system. Torsion bars 30 and 31 are operably and in effect disposed between the front and rear wheels of the vehicle with one torsion bar being provided on each side of the vehicle. A plurality of torsion bars could be provided on each side of the frame 10 but one is adequate in some cases and is thus satisfactory for the purpose of illustration. The chassis shown in the drawing is symmetrical and a detailed description of only one side thereof is made herein.

Torsion bar 30 is, in effect, fixedly attached to lower lever arm 17 so as to be twistable relative to the longitudinal axis of the torsion bar when lever arm 17 is pivoted about pivot support 15. A bracket 32 is mounted on frame 10 and a crank arm 33 is pivotally connected to bracket 32. The front end of torsion bar 30 is connected to crank arm 33 eccentrically of the pivot connection and the outer end of the crank arm abuttingly engages the lower lever 17. The rear end of torsion bar 30 is journaled in a bearing 36 at the rear end of the frame 10 and a crank portion 37 of torsion bar 30 extends towards the center of frame 10 and is operably attached to axle housing 28. Torsion bar 31 is mounted in the same manner on the other side of the frame 10.

With the above common spring type, torsion bar construction the torsion bar 30 is twisted or torsionally deflected in opposite directions upon vertical displacement of the front and rear wheels 11 and 13 in the same direction. That is, the raising of front wheel 11 causes twisting of torsion bar 30 in one direction and the raising of rear wheel 13 causes twisting of torsion bar 30 in the opposite direction.

The same is true for torsion bar 31 with respect to the other side of the frame 10.

The operation of the above described construction is such that there is a simultaneous application of substantially equivalent vertical forces at opposite ends of the frame 10 whenever a wheel or wheels at one end of the vehicle passes over a change in elevation. An upward movement of wheel 11, for example, causes vertical forces to be applied to the frame 10 through bracket 32 at the front of the frame and through bearing 36 at the rear of the frame.

Where a spring suspension is common to the front and rear wheels, however, as described above, a change in static or pay load at one end of the frame or body, such as the rear end, will effect an opposite change in elevation at the other end of the frame. For example, the addition of passengers or baggage at the rear will lower the elevation of the rear of the frame and body relative to the rear wheels and raise or elevate the front end relative to the front wheels.

In accordance with the invention there is provided novel apparatus to compensate for load variations on the frame 10 so that both ends of the frame are maintained at predetermined elevations or levels relative to the wheels of the vehicle. The object is to cause the vehicle to ride substantially level at an even keel. In the present invention the levelizing or load compensating function is accomplished with a new and improved anti-roll bar assembly (or assemblies) provided at the front or rear (or at both ends) of the vehicle.

The anti-roll bar assembly as illustrated herein is a part of the suspension system and, in addition to the normal or usual anti-roll function, also functions to effect levelizing of the vehicle. As illustrated herein the anti-roll bar assembly is provided for the rear of the vehicle.

At the rear of frame 10 there is provided an anti-roll bar 40 which extends transversely of the frame and is journaled in bearings 41 and 42 on each side of the frame. Anti-roll bar 40 is rigidly connected at opposite ends thereof to the rear lever arms 26 and 27. Movement of one of the lever arms 26 or 27 produces a twisting or torsional force in the bar 40 and this force is transmitted to the lever arm on the other side of the frame. In this construction anti-roll bar 40 performs its usual function to minimize rolling of the vehicle when one of the rear wheels 13 or 14 is raised or lowered. If rear wheel 13 is raised by a bump in the road for example, there is a simultaneous application of substantially equivalent vertical forces at opposite sides of the frame 10, these vertical forces being applied to the frame through bearings 41 and 42.

Referring to the levelizing function which anti-roll bar 40 has in the present invention, there is provided means for twisting the bar 40 in a tightening direction and in a loosening direction relative to frame 10 to respectively raise and lower the rear of the frame relative to the rear wheels 13 and 14. As illustrated herein there are provided torsionally deflectable tubular members 45 and 46 which surround opposite sides of bar 40. Tubular members 45 and 46 are each rigidly connected at their inner ends to a middle portion of the bar 40. The outer ends of tubular members 45 and 46 are not attached to bar 40 and are free to pivot or rotate relative to the bar 40. The outer ends of tubular members 45 and 46 are provided with spur gears 47 and 48. A shaft 49 journaled in frame 10 and extending transversely thereof in parallel relation to stabilizer bar 40 is provided with two spur gears 50 and 51 which meshingly engage spur gears 47 and 48 on tubular members 45 and 46. Motor means such as a small reversible type electric motor 52 is mounted on frame 10 and is connected to shaft 49 through gearing for rotating the shaft 49 in either direction.

Motor 52 is responsive to level sensing means which are not shown but which will be referred to further on. Motor 52 rotates shaft 49 in either direction which in turn causes a twisting or pivoting movement of the outer ends of tubular members 45 and 46. Tubular members 45 and 46 may be provided with longitudinally extending slits or slots (not shown) to facilitate twisting of the outer ends of the tubular members relative to the inner ends. When the outer ends of tubular members 45 and 46 are twisted in either direction the stabilizer bar 40 is also twisted in the same direction and the reaction forces are applied through frame bearings 41 and 42 to either raise or lower the rear of the frame 10 relative to the rear wheels 13 and 14. When the motor 52 stops, the outer ends of tubular members 45 and 46 will have been pivoted or twisted to positions which are temporarily fixed, as long as the loading on the frame 10 is not changed, such that a mean elevational position for the rear of the frame 10 relative to the rear wheels 13 and 14 is established. When the outer ends of tubular members 45 and 46 are in their temporary fixed positions, the stabilizing function of stabilizer bar 40 is not interfered with, however. The torsional resilience of tubular members 45 and 46 permits stabilizer bar 40 to transmit forces from lever arm 26 to lever arm 27, and vice versa, to effect stabilizing of the vehicle in the usual and normal manner when one of the rear wheels 13 or 14 encounters a changed elevation such as a bump or hole in the road. The tubular members 45 and 46 yieldingly twist when a twisting force is applied to stabilizer bar 40 due to one of the rear wheels 13 and 14 encountering a bump or hole in the road but, after the bump or hole is passed, the tubular members 45 and 46 exert torsional restoring forces on stabilizer bar 40 to again move the rear of frame 10 to a predetermined height relative to the rear wheels 13 and 14.

Motor 52 is actuated in response to level sensing apparatus (not shown) which functions as an indicator with regard to the level of the rear end of frame 10 relative to the rear wheels 13 and 14 of the vehicle. Level sensing apparatus of various types have been developed and are well known. In this instance level sensing apparatus could be provided which indicates the vertical spacing between the rear of the frame 10 and axle housing 28 and would include a switch which would cause motor 52 to rotate in one direction when the spacing is less than a predetermined distance and cause motor 52 to rotate in the opposite direction when the spacing is more than a predetermined distance. In this manner the amount of twist imparted to tubular members 45 and 46 would be controlled by level sensing apparatus.

If desired the level sensing apparatus could have a time delay or lag of several seconds to avoid a hunting condition which would cause almost continuous operation of motor 52 when long stretches of relatively rough roadway are encountered.

At the front end of frame 10 there is provided a stabilizer or anti-roll bar 60. If desired, apparatus which is the same or similar to the apparatus provided for stabilizer bar 40 may be provided in conjunction with stabilizer bar 60.

Stabilizer bar 60 extends transversely of frame 10 and is journaled in bearings 61 and 62 on each side of the frame. Stabilizer bar 60 is provided with crank or lever portions 63 and 64 which are connected respectively to the lower front wheel lever arms 17 and 20.

Movement of one of the lever arms 18 or 21 produces a twisting or torsional force in the anti-roll bar 60 and this force is transmitted to the lever arm on the other side of the frame. In this construction stabilizer bar 60 performs its usual stabilizing function to minimize lateral swaying or rolling of the vehicle when one of the front wheels 11 or 12 is raised or lowered. If front wheel 11 is raised by a bump in the road for example, there is a simultaneous application of substantially equivalent vertical forces at opposite sides of the frame 10, these vertical forces being applied to the frame through bearings 61 and 62.

It will be understood that within the scope of the invention a vehicle may be provided with a stabilizer and leveler unit for both the front and rear of the frame 10 or, if only one unit is utilized, the unit may be provided for the front or the rear of the vehicle. If only one unit is utilized, however, it will usually be preferable to provide it at the rear of the vehicle because the rear of a vehicle is subjected to more variation in loads due to the fact that the number of passengers carried will vary and the loading of luggage in the trunk of the vehicle will vary.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. In a suspension for a vehicle having a frame and front and rear wheels, front levers connecting said front wheels to said frame for pivotal movement about longitudinal axes, rear levers operably connecting said rear wheels to said frame for pivotal movement about a transverse axis, first torsion bar means on one side of said frame operably connected to one of said front levers for pivotal movement therewith and operably connected to the rear of said frame, means for operably connecting said torsion bar members to said rear wheels, a rear stabilizer bar journaled in said frame and connecting said rear levers, two tubular members surrounding opposite sides of said rear stabilizer bar with each tubular member being connected to a middle portion of the rear stabilizer bar, means engaging the outer ends of said tubular members for twisting said rear stabilizer bar in a tightening direction and in a loosening direction relative to said frame to respectively raise and lower the rear of said frame relative to said rear wheels.

2. In a suspension for a vehicle having a frame and front and rear wheels, front levers connecting said front wheels to said frame for pivotal movement about longitudinal axes, rear levers operably connecting said rear wheels to said frame for pivotal movement about a transverse axis, an axle housing extending between said rear wheels, first torsion bar means on one side of said frame operably connected to one of said front levers for pivotal movement therewith and operably connected to the rear of said frame, second torsion bar means on the other side of said frame operably connected to the other of said front levers for pivotal movement therewith and operably connected to the rear of said frame, two crank members respectively connecting said torsion bar members to said rear axle, a rear stabilizer bar journaled in said frame and connecting said rear levers, two tubular members surrounding opposite sides of said rear stabilizer bar with each tubular member being connected to a middle portion of the rear stabilizer bar, and means engaging the outer ends of said tubular members for twisting said rear stabilizer bar in a tightening direction and in a loosening direction relative to said frame to respectively raise and lower the rear of said frame relative to said rear wheels.

3. In a suspension for a vehicle having a frame and front and rear wheels, spring means common to the front and rear wheels of said vehicle, a rear stabilizer bar operably disposed between said rear wheels, two tubular members surrounding opposite sides of said rear stabilizer bar with each tubular member being connected to a middle portion of the rear stabilizer bar, means engaging the outer ends of said tubular members for twisting said rear stabilizer bar in a tightening direction and in a loosening direction relative to said frame to respectively raise and lower the rear of said frame relative to said rear wheels.

4. In a suspension for a vehicle having a frame and front and rear wheels, spring means common to the front and rear wheels of said vehicle, a transversely extending stabilizer bar operably disposed between a pair of said wheels, two tubular elements surrounding opposite sides of said front stabilizer bar with each tubular element being connected to a middle portion of the front stabilizer bar, and means engaging the outer ends of said tubular elements for twisting said stabilizer bar in a tightening direction and in a loosening direction relative to said frame to respectively raise and lower the corresponding end of said frame relative to said pair of wheels.

5. In a suspension for a vehicle having a frame and front and rear wheels, resilient means operably disposed between said wheels and said frame, a rear stabilizer bar operably disposed between said rear wheels, two tubular members surrounding opposite sides of said rear stabilizer bar with each tubular member being connected to a middle portion of the rear stabilizer bar, and means engaging the outer ends of said tubular members for twisting said rear stabilizer bar in a tightening direction and in a loosening direction relative to said frame to respectively raise and lower the rear of said frame relative to said rear wheels.

6. In a suspension for a vehicle having a frame and front and rear wheels, resilient means operably disposed between said wheels and said frame, a transversely extending stabilizer bar operably disposed between a pair of said wheels, two tubular elements surrounding opposite sides of said stabilizer bar with each tubular element being connected to a middle portion of the stabilizer bar, and means engaging the outer ends of said tubular elements for twisting said stabilizer bar in a tightening direction and in a loosening direction relative to said frame to respectively raise and lower the corresponding end of said frame relative to said pair of wheels.

References Cited in the file of this patent

UNITED STATES PATENTS

| 2,607,611 | Allison | Aug. 19, 1952 |
| 2,733,934 | Muller | Feb. 7, 1956 |

FOREIGN PATENTS

| 715,426 | Great Britain | Sept. 15, 1954 |